US012639160B2

(12) United States Patent
Chai

(10) Patent No.: US 12,639,160 B2
(45) Date of Patent: May 26, 2026

(54) PARALLEL BLOCK FOLDING WITH ERROR CORRECTION

(71) Applicant: Micron Technology, Inc., Boise, ID (US)

(72) Inventor: Hanchao Chai, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 18/955,134

(22) Filed: Nov. 21, 2024

(65) Prior Publication Data

US 2026/0140814 A1 May 21, 2026

(51) Int. Cl.
*G06F 11/00* (2006.01)
*G06F 11/07* (2006.01)

(52) U.S. Cl.
CPC ................................ *G06F 11/0793* (2013.01)

(58) Field of Classification Search
CPC .................................................. G06F 11/0793
See application file for complete search history.

(56) References Cited

U.S. PATENT DOCUMENTS

| | | | |
|---|---|---|---|
| 11,662,905 B2 * | 5/2023 | Fitzpatrick | ........... G11C 29/021 711/103 |
| 2017/0116070 A1 * | 4/2017 | Alrod | ...................... G11C 16/26 |
| 2020/0117527 A1 * | 4/2020 | Tomic | ................. G06F 12/0246 |
| 2023/0097679 A1 * | 3/2023 | Sharifi Tehrani | ............................ G11C 29/12015 365/185.09 |

* cited by examiner

*Primary Examiner* — Jason B Bryan
(74) *Attorney, Agent, or Firm* — Schwegman Lundberg & Woessner, P.A.

(57) ABSTRACT

This disclosure is directed to a system for performing read error handling. The system reads a first portion of a memory block from a memory device and skips reading a second portion of the memory block when determining that a read bit error rate (RBER) associated with the second portion of the memory block transgresses an RBER threshold. The system, before initiating error correction operations on the second portion, continues to read additional portions of the memory block after determining that the RBER associated with the second portion of the memory block transgresses the RBER threshold and performs the error correction operations on the second portion using at least the first portion of the memory block and the additional portions of the memory block to correct the second portion of the memory block.

20 Claims, 5 Drawing Sheets

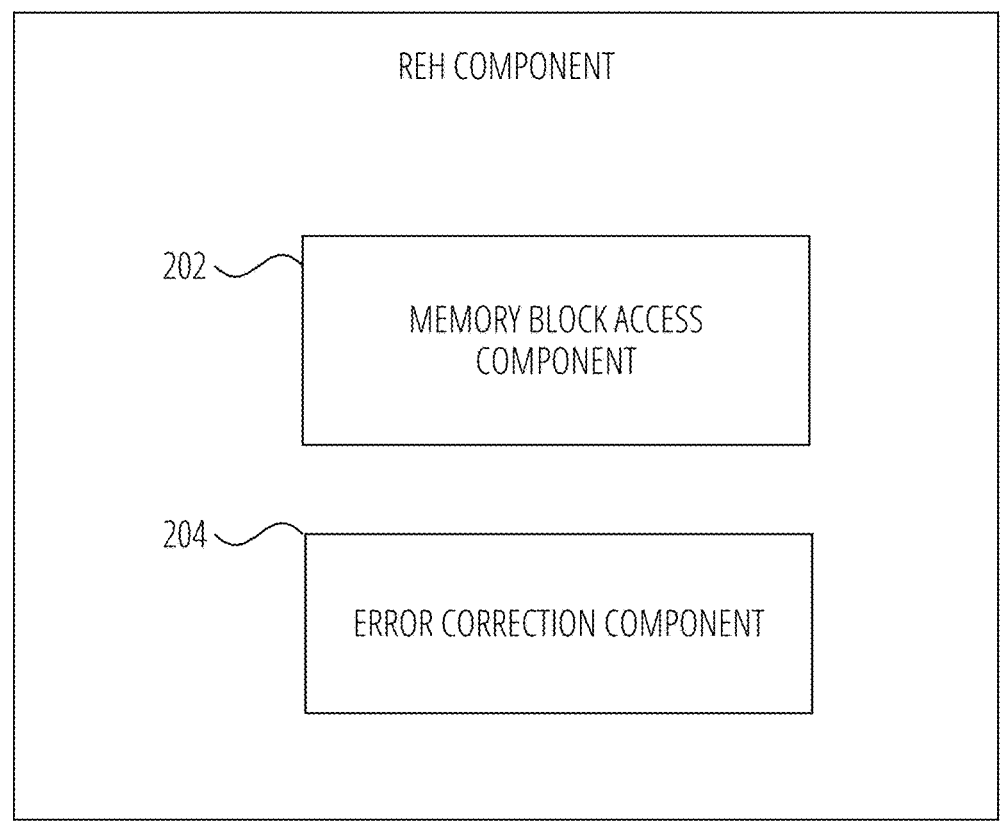
FIG. 2

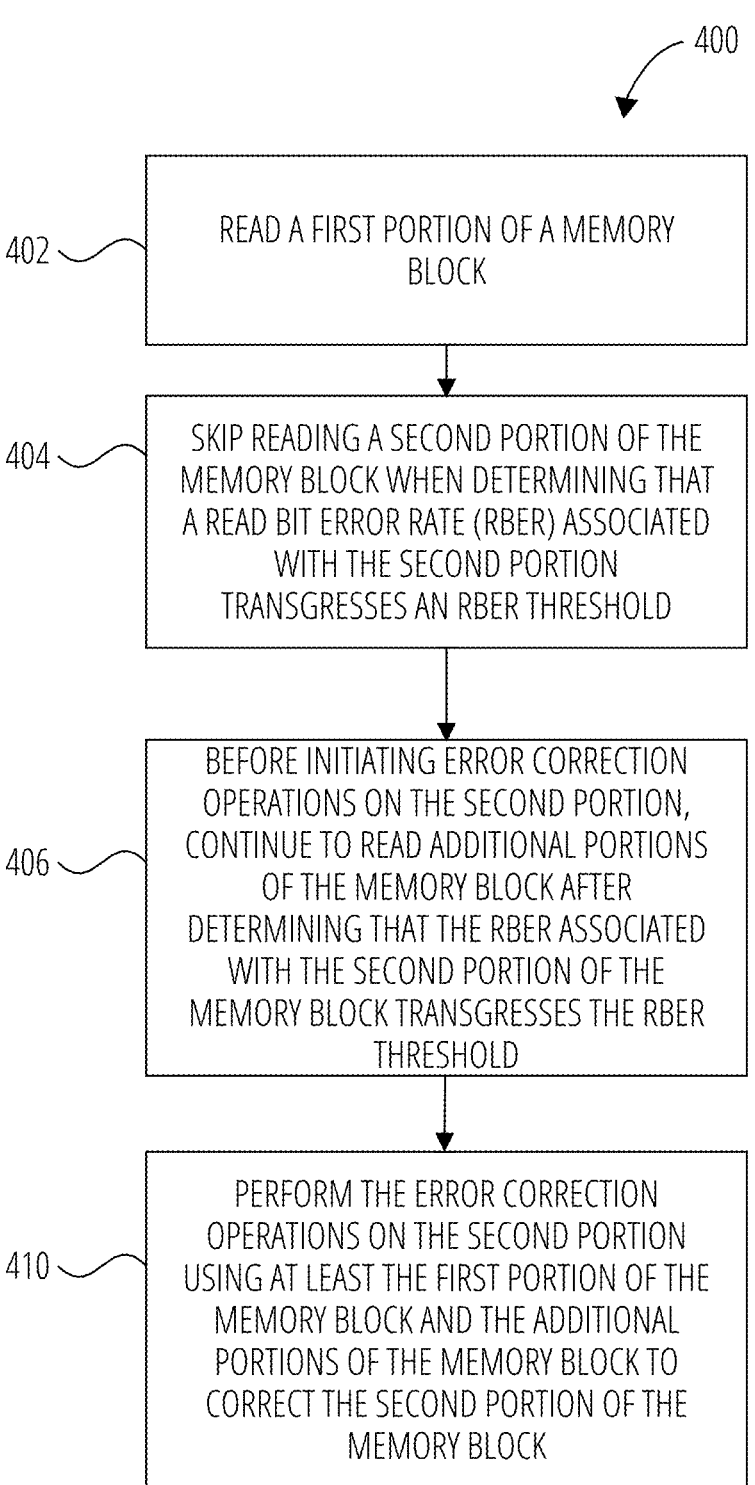

400

402 — READ A FIRST PORTION OF A MEMORY BLOCK

404 — SKIP READING A SECOND PORTION OF THE MEMORY BLOCK WHEN DETERMINING THAT A READ BIT ERROR RATE (RBER) ASSOCIATED WITH THE SECOND PORTION TRANSGRESSES AN RBER THRESHOLD

406 — BEFORE INITIATING ERROR CORRECTION OPERATIONS ON THE SECOND PORTION, CONTINUE TO READ ADDITIONAL PORTIONS OF THE MEMORY BLOCK AFTER DETERMINING THAT THE RBER ASSOCIATED WITH THE SECOND PORTION OF THE MEMORY BLOCK TRANSGRESSES THE RBER THRESHOLD

410 — PERFORM THE ERROR CORRECTION OPERATIONS ON THE SECOND PORTION USING AT LEAST THE FIRST PORTION OF THE MEMORY BLOCK AND THE ADDITIONAL PORTIONS OF THE MEMORY BLOCK TO CORRECT THE SECOND PORTION OF THE MEMORY BLOCK

FIG. 4

PARALLEL BLOCK FOLDING WITH ERROR CORRECTION

TECHNICAL FIELD

Examples of the disclosure relate generally to memory sub-systems and, more specifically, to performing read error handling (REH) operations.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various examples of the disclosure. The drawings, however, should not be taken to limit the disclosure to the specific examples, but are for explanation and understanding only.

FIG. 2 is a block diagram of a storage management component, in accordance with some examples.

FIG. 4 illustrates a diagram of operations performed using the storage management component, in accordance with some examples.

DETAILED DESCRIPTION

Figure 1:
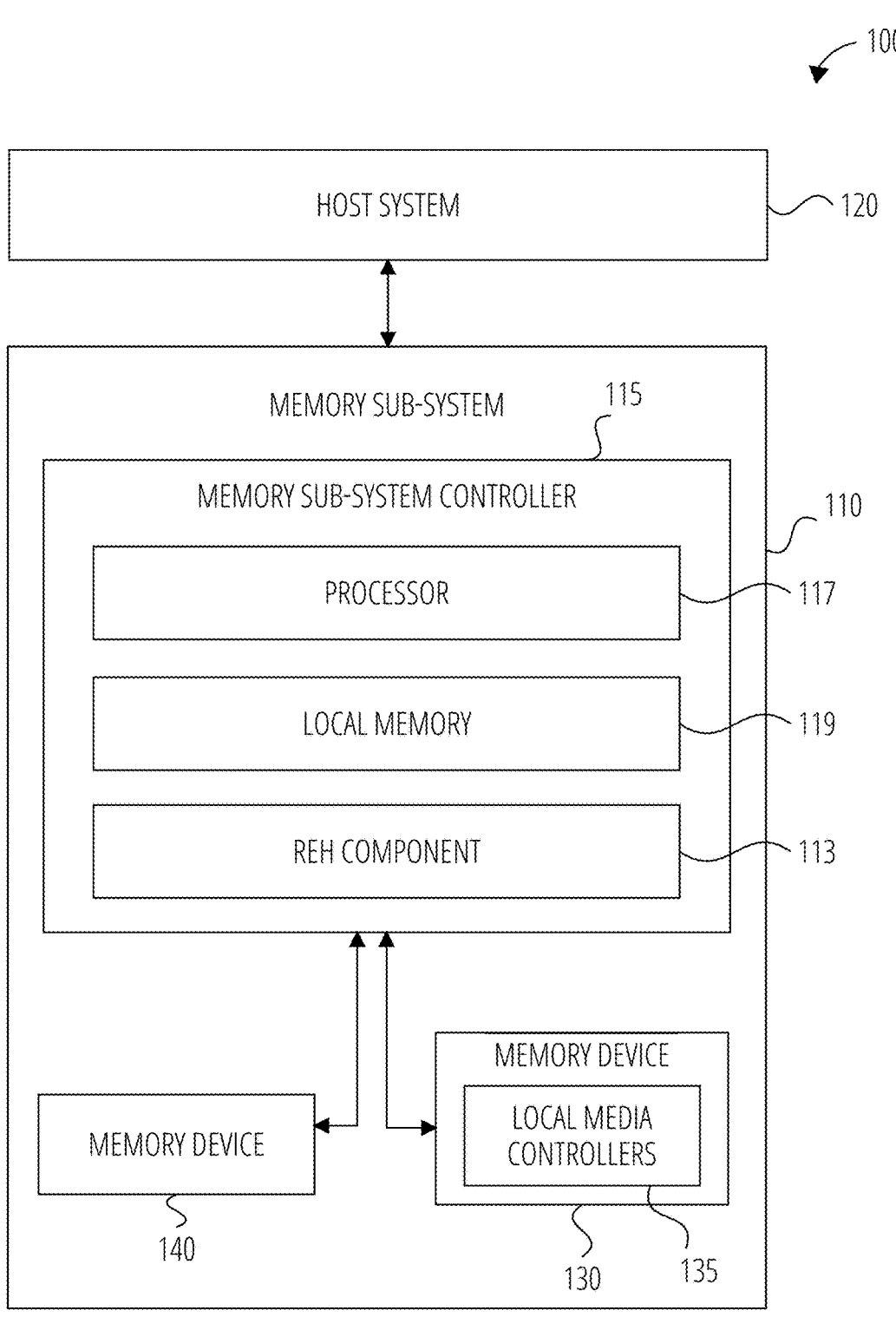
FIG. 1 is a block diagram illustrating an example computing system that includes a memory sub-system, in accordance with some examples.

The present disclosure is directed to a system including a memory device and a processing device, operatively coupled to the memory device, configured to perform operations that improve REH, such as in the case of folding operations. Specifically, the disclosed processing device selects a memory block (e.g., a block stripe (BS)) to read, access, and/or fold. The processing device can begin reading portions of the memory block and when an individual portion is detected that has uncorrectable errors (e.g., the read bit error rate (RBER) transgresses a threshold RBER), the processing device marks the individual portion and skips reading this portion and continues reading the rest of the memory block. When each portion of the memory block is read, the processing device performs error correction operations on the individual portion in parallel using the read portions. Because the processing device continues reading portions of the memory block and skips encountering failure in a particular portion, the efficiency of reading, accessing, and/or folding data is increased. Namely, rather than stopping to correct the errors in the failed portion and then re-reading the memory block having the corrected data, the disclosed techniques read and correct the data in a single task, which greatly improves the efficiency of the memory device.

A memory sub-system can be a storage device, a memory module, or a hybrid of a storage device and memory module.

Examples of storage devices and memory modules are described below in conjunction with FIG. 1. In general, a host system can utilize a memory sub-system that includes one or more components, such as memory devices that store data. The host system can send access requests to the memory sub-system, such as to store data at the memory sub-system and to read data from the memory sub-system.

The host system can send access requests (e.g., write command, read command, erase command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data" or "user data."

A host request can include logical address information (e.g., logical block address (LBA), namespace) for the host data, which is the location the host system associates with the host data and a particular zone in which to store or access the host data. The logical address information (e.g., LBA, namespace) can be part of metadata for the host data. Metadata can also include error handling data (e.g., error-correcting code (ECC) code word, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection (GC) management operations. The data that is re-written, for example as initiated by the firmware, is hereinafter referred to as "GC data."

Examples of system data include, but are not limited to, system tables (e.g., logical-to-physical memory address mapping table, also referred to herein as a logical-to-physical (L2P) mapping table (referred to as an L2P table), data from logging, scratch pad data, and so forth).

A memory device can be a non-volatile memory device. A non-volatile memory device is a package of one or more die. Each die can be comprised of one or more planes. For some types of non-volatile memory devices (e.g., NAND-type devices), each plane is comprised of a set of physical blocks. For some memory devices, blocks are the smallest area that can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package. The memory device can be divided into one or more zones where each zone is associated with a different set of host data or user data or application.

Certain memory devices, such as NAND-type memory devices, comprise one or more blocks, (e.g., multiple blocks), with each of those blocks comprising multiple memory cells. For instance, a memory device can comprise multiple pages (also referred to as word lines (WLs)), with each page comprising a subset of memory cells of the memory device. A threshold voltage (VT) of a memory cell (of a block) can be the voltage at which the floating gate (e.g., NAND transistor), implementing the memory cell, turns on and conducts (e.g., to a bit line coupled to the memory cell). Generally, writing data to such memory devices involves programming (by way of a program operation) the memory devices at the page level of a block, and erasing data from such memory devices involves erasing the memory devices at the block level (e.g., page level erasure of data is not possible).

Conventional systems perform GC operations using physical-to-logical (P2L) entries representing data stored across multiple logical unit numbers (LUNs) of one or more memory devices. For example, in conventional approaches, portions of data of a BS are stored across multiple planes of a LUN. While this data is being stored, P2L entries are generated representing the physical address of each portion of data and the corresponding logical address of that respective portion. During GC operations, validity of the data needs to be determined in order to select whether to erase data stored in a portion of the LUN or move the data to a new physical address or storage location. Conventionally, this is performed by playback of the P2L entries in a particular P2L table. For example, in order to perform GC operations on the BS, P2L entries stored in the particular P2L table are retrieved in the same sequence as they were written. Once all of the P2L entries of the BS are retrieved, the corresponding logical addresses matching those in the P2L entries are checked in the L2P table to determine validity of the data. After this check is performed, GC operations can be completed.

In conventional memory systems, the process of handling data failures in memory blocks often leads to inefficiencies and increased latency. When a failure is encountered in a portion of a memory block during a read operation, the conventional approach involves a multi-step process that can significantly impact system performance. Initially, the system attempts to correct the failure in the affected portion of the memory block. This correction process typically involves complex error detection and correction algorithms, such as RAIN operations, which consume valuable processing time and resources. Once the failure is addressed, the system then completes the reading of the remaining data in the block. However, the inefficiency is compounded by the subsequent step, where the entire memory block, including the portions that were previously read successfully, is re-read in its entirety. This redundant reading of already accessed data wastes time and system resources. The repetitive nature of this process can lead to substantial delays, especially in scenarios where multiple failures occur across different memory blocks. Furthermore, this approach may not always be optimal for data integrity, as it assumes that the correction of the initial failure resolves all potential issues within the block. Consequently, these inefficiencies can result in reduced overall system performance, increased power consumption, and potentially compromised data reliability in certain cases.

The present disclosure addresses these inefficiencies by implementing a more proactive and comprehensive folding approach. Specifically, according to the disclosed techniques, instead of waiting for the read error handle process (RAIN recovery operations) when an error (e.g., an uncorrectable error) is detected, the disclosed techniques continue reading additional portions of the memory block and performing error correction operations in parallel. By reading the first portion, skipping encountering an error in the second portion, and then continuing to read additional portions, the system gathers a more comprehensive set of data. This holistic approach enables the error correction operations to utilize information from the successfully read portions (the first portion and additional portions) to correct the problematic second portion. This method eliminates the need for re-reading previously accessed data, reducing latency and improving overall system performance. Furthermore, by leveraging data from multiple portions of the memory block, the error correction process potentially becomes more robust and efficient, enhancing data reliability. This technique optimizes resource utilization, minimizes unnecessary read operations, and streamlines the error handling process, resulting in a more efficient and responsive memory system.

In some examples, the techniques described herein relate to a system having a processing device operatively coupled to a memory device. In some examples, the processing device reads portions of a memory block, skips reading the portion of which the RBER exceeds a threshold, continues reading additional portions and then performs error correction using data from each read portion. This approach improves efficiency by gathering data and attempting error correction in parallel. In some cases, the reading process is initiated in response to a request to read a memory block. Furthermore, this read request may be generated by the processing device in response to a request to fold the memory block.

The system's functionality can be extended to include a data transfer process. After reading and correcting the memory block portions, valid data is transferred to a new memory block, such as to perform data relocation as part of the operations of reading and correcting data in parallel. To identify valid data within the memory block, the processing device may search a L2P table using P2L information associated with the memory block.

Regarding the memory block structure, in some cases, the memory block can be a BS with portions stored on different LUNs. Additionally, different LUNs may correspond to different memory dies. The processing device determines if the RBER threshold is transgressed by focusing on uncorrectable errors in one or more planes of a LUN. The error correction operations employed can include redundant array of independent NAND (RAIN) operations. In some implementations, XOR logic operations on data from various portions of the memory block are used to recover data from the portion with errors.

When performing error correction, the system ensures that all portions of the memory block, except those with high RBER, have been read including valid and invalid data. For example, the processing device can read valid data and invalid data of the first portion of the memory block and access error correction information associated with the memory block. The processing device can correct the second portion using the valid data and invalid data of the first portion and the error correction information. Then, the processing device can discard the invalid data after correcting the second portion. In some cases, the processing device can determine which set of data in the second portion corresponds to valid data and correct the set of data in the second portion that corresponds to valid data without correcting invalid data of the second portion. The process of determining which data is valid and which is invalid can be performed using logical addresses stored in the P2L entries of the memory block and the corresponding logical addresses stored in L2P entries indicating whether the data is valid or not. This comprehensive data collection approach enhances the error correction process. Also, in some examples, the memory device can be a three-dimensional (3D) NAND device.

Though various examples are described herein as being implemented with respect to a memory sub-system (e.g., a controller of the memory sub-system), some or all of the portions of an example can be implemented with respect to a host system, such as a software application or an operating system of the host system.

FIG. 1 illustrates an example computing system 100 that includes a memory sub-system 110, in accordance with some examples. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some examples, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller). The host system 120 uses the memory sub-system 110, for example, to write data to the memory sub-system 110 and read data from the memory sub-system 110.

The host system 120 can include or be coupled to the memory sub-system 110 so that the host system 120 can read data from or write data to the memory sub-system 110. The host system 120 can be coupled to the memory sub-system 110 via a physical host interface. Examples of a physical host interface include, but are not limited to, a serial advanced technology attachment (SATA) interface, a peripheral component interconnect express (PCIe) interface, a compute express link (CXL) interface, a universal serial bus (USB) interface, a Fibre Channel interface, a Serial Attached SCSI (SAS) interface, etc. The physical host interface can be used to transmit data between the host system 120 and the memory sub-system 110. The host system 120 can further utilize an NVM Express (NVMe) interface to access the memory devices 130, 140 when the memory sub-system 110 is coupled with the host system 120 by the PCIe or CXL interface. The physical host interface can provide an interface for passing control, address, data, and other signals between the memory sub-system 110 and the host system 120.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a NAND type flash memory and write-in-place memory, such as a three-dimensional (3D) cross-point memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional (2D) NAND and 3D NAND.

Each of the memory devices 130, 140 can include one or more arrays of memory cells. One type of memory cell, for example, single level cells (SLCs), can store one bit per cell. Other types of memory cells, such as multi-level cells (MLCs), tri-level cells (TLCs), quad-level cells (QLCs), and penta-level cells (PLCs), can store multiple bits per cell. In some examples, each of the memory devices 130, 140 can include one or more arrays of memory cells such as SLCs, MLCs, TLCs, QLCs, or any combination of such. In some examples, a particular memory device can include an SLC portion, an MLC portion, a TLC portion, or a QLC portion of memory cells. The memory cells of the memory devices 130, 140 can be grouped as pages that can refer to a logical unit of the memory device used to store data. With some types of memory (e.g., NAND), pages can be grouped to form blocks or BSs. As used herein, a block comprising SLCs can be referred to as a SLC block, a block comprising MLCs can be referred to as a MLC block, a block comprising TLCs can be referred to as a TLC block, and a block comprising QLCs can be referred to as a QLC block.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide-based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide-based RRAM (OxRAM), negative-or (NOR) flash memory, and electrically erasable programmable read-only memory (EEPROM).

A memory sub-system controller 115 (or controller 115 for simplicity) can communicate with the memory devices 130, 140 to perform operations such as reading data, writing data, or erasing data (e.g., performing GC operations) at the memory devices 130, 140 and other such operations. The memory sub-system controller 115 can include hardware such as one or more integrated circuits and/or discrete components, a buffer memory, or a combination thereof. The hardware can include digital circuitry with dedicated (e.g., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some examples, the local memory 119 can include memory registers storing memory pointers, fetched data, and so forth. The local memory 119 can also include ROM for storing micro-code. While the example memory sub-system 110 in FIG. 1 has been illustrated as including the memory sub-system controller 115, in another example, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, GC operations, error detection and ECC operations, encryption operations, caching operations, and address translations between a logical address (e.g., LBA, namespace) and a physical memory address (e.g., physical block address in a physical address space of the memory device 130 or memory device 140) that are associated with the memory devices 130, 140. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130, 140.

In some examples, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some examples, a memory device 130 is a managed memory device, which is a raw memory device combined with a local controller (e.g., local media controller 135) for media management within the same memory device package. An example of a managed memory device is a managed NAND (MNAND) device. Any operation discussed as being performed by the memory sub-system controller 115 can be similarly performed by the local media controllers 135 and vice versa.

The memory sub-system controller 115 includes a REH component 113 that enables or facilitates the memory sub-system controller 115 to implement a more proactive and comprehensive folding approach than conventional systems. Upon receiving a request to read data, instead of waiting for the read error handle process (RAIN recovery operations) when an error (e.g., an uncorrectable error) is detected, the REH component 113 continues reading additional portions of the memory block (e.g., BS) and performing error correction operations in parallel. By reading a first portion of the BS, skipping encountering an error in a second portion of the BS, and then continuing to read additional portions of the BS, the REH component 113 gathers a more comprehensive set of data. This holistic approach enables the error correction operations of the REH component 113 to utilize information from the successfully read portions (the first portion and additional portions) to correct the failure in the second portion. This method eliminates the need for re-reading previously accessed data, reducing latency and improving overall system performance. Furthermore, by leveraging data from multiple portions of the memory block, the error correction process potentially becomes more robust and efficient, enhancing data reliability. This technique optimizes resource utilization, minimizes unnecessary read operations, and streamlines the error handling process, resulting in a more efficient and responsive memory system. Namely, the REH component 113 can read a first portion of a memory block and skip reading a second portion of the memory block from a memory device when determining that a RBER associated with the second portion of the memory block transgresses an RBER threshold. The REH component 113, before initiating error correction operations on the second portion, continues to read additional portions of the memory block after determining that the RBER associated with the second portion of the memory block transgresses the RBER threshold, and performs the error correction operations on the second portion using at least the first portion of the memory block and the additional portions of the memory block to correct the second portion of the memory block.

Any discussion with respect to the memory device 130 can similarly be applied to the memory device 140.

FIG. 2 is a block diagram of a REH component 113, in accordance with some examples. The REH component 113 can include a memory block access component 202 and/or an error correction component 204. Specifically, the REH component 113 includes several subcomponents (e.g., the memory block access component 202 and the error correction component 204) that work together to improve the operations of the memory sub-system 110. The REH component 113 is designed to improve the efficiency and performance of REH operations in the memory sub-system 110.

The memory block access component 202 can be responsible for reading portions of a memory block from the memory device 130, such as in the process of performing data folding operations for the memory block (where valid data is transferred to a new memory block), accessing data from the memory block (e.g., to refresh the data), and/or responding to read requests to read data from the memory block received from the host system 120. The memory block access component 202 can initiate the reading process, starting with a first portion of the memory block (e.g., a portion stored in a first set of planes of a first LUN) and continuing to read additional portions (e.g., portions stored in additional planes of one or more additional LUNS), skipping reading portions if a RBER associated with any portion transgresses an RBER threshold. Namely, the memory block access component 202 continues reading data from various portions of the memory block (e.g., each plane of each LUN across which data of the memory block is distributed) even when an uncorrectable error or failure is detected in any plane and/or LUN. This proactive approach ensures that more data is gathered before initiating error correction operations.

When the memory block access component 202 completes reading or accessing data from each portion of the memory block except the failed portions, the memory block access component 202 then instructs the error correction component 204 to correct the portion of the memory block that has the failure. The error correction component 204 can be tasked with performing error correction operations on portions of the memory block that have uncorrectable errors. Once the memory block access component 202 has read the portions of the memory block (including the valid data, and/or invalid data, and RAIN data), the error correction component 204 uses the data from the successfully read portions to correct the errors in the failed portions. This method leverages data from multiple portions of the memory block to enhance the robustness and efficiency of the error correction process. In some cases, the error correction component 204 implements a RAIN operation, which leverages or uses parity information or error correction information stored in one or more planes or LUNs for the memory block to correct errors in other planes or LUNs for the memory block.

The error correction operations may include XOR logic operations to recover data from portions with errors. After the error correction component 204 corrects the failed portion of the memory block, the memory block access component 202 can provide all the valid data of the memory block, including the corrected valid data, to satisfy a request associated with the memory block. For example, the memory block access component 202 can transfer the valid data to a new memory block. As another example, the memory block access component 202 can return the valid data to the host system 120 from which the request to read the memory block was received.

Figure 3:
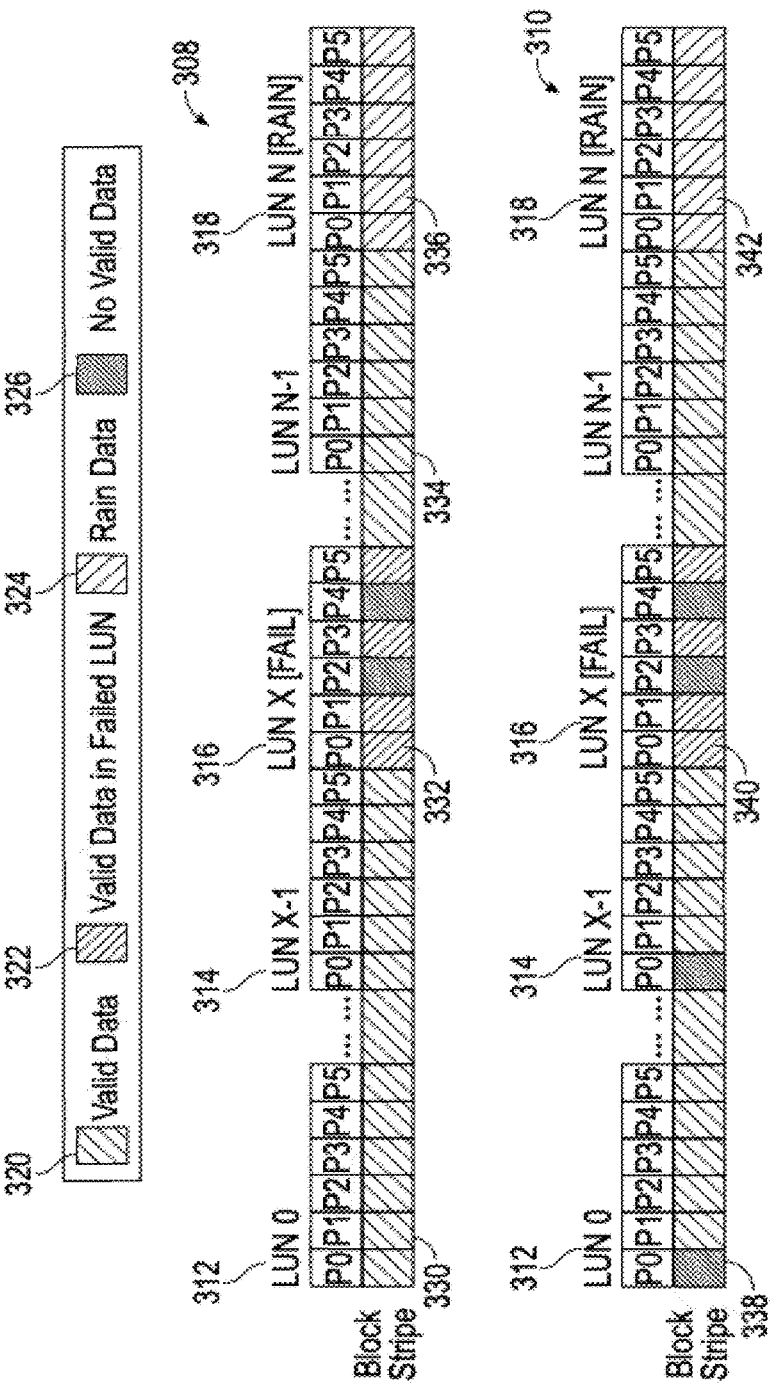
FIG. 3 illustrates memory blocks that are read and corrected, in accordance with some examples.

FIG. 3 illustrates memory blocks that are read and corrected by the REH component 113, which includes the memory block access component 202 and the error correction component 204, as depicted in FIG. 2, according to some examples.

In FIG. 3, two memory blocks including a first memory block 308 and a second memory block 310 are shown. As shown, data for the first memory block 308 and second memory block 310 is stored across multiple logical unit numbers (LUNs) including a first LUN 312, a second LUN 314, a third LUN 316, and a LUN N 318. Each LUN can include several planes (P0, P1, P2, and so forth), which store data for the memory block. In this way, data for a single BS can be distributed across multiple planes of different LUNs (e.g., different memory dies).

In some examples, the memory block access component 202 reads these planes sequentially, starting with data stored across planes of the first LUN 312 (e.g., a first portion of memory block 330) and continuing to read additional portions (e.g., data stored across planes of second LUN 314, and LUN N 318), skipping reading the third LUN 316 if a RBER associated with any portion transgresses an RBER threshold. For instance, in the first memory block 308, the memory block access component 202 reads data stored across planes P0-P5 of the first LUN 312. When the memory block access component 202 detects a LUN with uncorrectable errors (e.g., data stored in plane 0 of the second portion of memory block 332, such as in third LUN 316), the memory block access component 202 skips reading the planes P0-P5 of LUN 316 and continues to read additional planes of other portions, such as planes P0-P5 of additional portions of memory block 334 including planes of LUN N 318 that store error correction information 336. This approach ensures that more data is gathered and reading error portion is avoid when performing error correction operations.

When the memory block access component 202 determines that the each memory block has been accessed or read except the portions with the uncorrectable errors, the memory block access component 202 instructs the error correction component 204 to perform error correction on the failed portions (or only on the valid data in failed LUN 322). Namely, the error correction component 204 can perform error correction operations on the problematic planes of the second portion of the memory block 332 (e.g., to correct the valid data in failed LUN 322 stored in planes P0, P1, and/or P5 of the third LUN 316). This is performed even when the other planes of the third LUN 316 have no valid data 326. Using valid data 320 and invalid data (e.g., no valid data 326) from the successfully read planes or portions (e.g., the data read from planes P0-P5 of first LUN 312, second LUN 314, and LUN N 318 including the error correction data 324), the error correction component 204 corrects the errors in the third LUN 316 (e.g., the second portion of the memory block 332). This method leverages data from multiple portions of the memory block to enhance the robustness and efficiency of the error correction process.

In some cases, the memory block access component 202 determines that only some regions (e.g., planes) of the second portion of the memory block 332 include valid data and other regions (e.g., planes) include invalid data. For example, the memory block access component 202 can determine that there exists valid data only in planes P0, P1, P3, and P5 of the second portion of the memory block 332, which includes the uncorrectable errors, and that no valid data 326 is present in planes P2 and P4. This determination can be performed by the memory block access component 202 accessing logical addresses from the P2L entry for the second portion of the memory block 332 (e.g., by retrieving the logical address mapped to the physical address corresponding to the planes of the third LUN 316 in which the data for the second portion of the memory block 332 is stored) and searching the L2P table for the corresponding logical addresses to determine whether the L2P table indicates that those logical addresses include valid data or not. The memory block access component 202 can instruct the error correction component 204 to only perform error correction on the valid data in the second portion of the memory block 332 and discard or not correct the invalid data of the second portion of the memory block 332. This increases the efficiency of correcting errors in the first memory block 308. The determination of which portions of the first memory block 308 contain valid data using the P2L entry can be performed before, during, or after reading or accessing the portions of data for the first memory block 308. This information can then be stored in association with each portion or plane of the first memory block 308.

After reading and correcting the memory block portions, the entire first memory block 308 is determined to be completely read and corrected. Valid data stored in the first memory block 308 that has been read and corrected can then be transferred to a new memory block and/or returned to the host system 120 from which a request to read the first memory block 308 was received. In some cases, the memory block access component 202 uses a P2L table or entry stored in association with the first memory block 308 to determine which portions of the first memory block 308 include valid data, such as by searching the L2P table using the P2L entries. Then, the memory block access component 202 is able to only store the valid data to the new memory block.

In some cases, the memory block access component 202 can determine that an individual plane or region of a portion of the memory block that does not have a failure includes invalid data. The memory block access component 202 can still read that individual plane or region so that the data from that invalid data can be used to subsequently perform error correction on data stored in failed planes or regions of another portion of the memory block. The invalid data, after being used to correct a failed portion, can be discarded and not transferred to the new block or returned to the host system 120 when the memory block is completely read and corrected.

For example, the memory block access component 202 can receive a request to read the second memory block 310. The memory block access component 202 can begin reading data (valid and invalid data) for the second memory block 310 starting from a first portion of a memory block 338. The memory block access component 202 can determine that the first portion of the memory block 338 includes invalid data in plane P0 and includes valid data in planes P1-P5 of the first LUN 312. The memory block access component 202 can still read planes P0-P5 including the invalid data as such data may need to be used for performing subsequent error correction on a failed portion of the second memory block 310. Namely, after reading the first portion of the memory block 338, the memory block access component 202 can read data stored in the second LUN 314, which may also include invalid data.

The memory block access component 202 can determine that the second portion of the memory block 340 includes an RBER that transgresses an RBER threshold (e.g., includes uncorrectable errors) and skip reading the planes P0-P5 of the LUN 316. In such cases, the memory block access component 202 continues reading subsequent portions of the second memory block 310. When each portion of the second memory block 310 is completely read including valid and invalid data, the memory block access component 202 uses the read portions (which do not have uncorrectable errors) and error correction information 342 of the second memory block 310 to correct the uncorrectable errors in the second portion of the memory block 340 for the second memory block 310. For example, the error correction component 204 can use the valid and invalid data of the first portion of the memory block 338 along with the error correction information 342 to correct the failed portions of the second portion of the memory block 340 (e.g., only the valid regions of the second portion of the memory block 340 and/or all of the regions including valid and invalid data).

After the second portion of the memory block 340 is corrected using the valid and invalid data of other portions (e.g., the first portion of the memory block 338) and the error correction information 342, the read and corrected second memory block 310 can be utilized. For example, the REH component 113 can then transfer only the valid data that has been read to a new memory block and/or to the host system 120.

FIG. 4 is a flow diagram of an example diagram 400 (method or process) performed using the REH component 113, in accordance with some examples. The method or process of diagram 400 can be performed by processing logic that can include hardware (e.g., a processing device, circuitry, dedicated logic, programmable logic, microcode, hardware of a device, an integrated circuit, etc.), software (e.g., instructions run or executed on a processing device), or a combination thereof. In some examples, the method or process of diagram 400 is performed by the memory sub-system controller 115 or subcomponents of the memory sub-system controller 115 of FIG. 1. In these examples, the method or process of diagram 400 can be performed, at least in part, by the REH component 113. Although the processes are shown in a particular sequence or order, unless otherwise specified, the order of the processes can be modified. Thus, the illustrated examples should be understood only as examples; the illustrated processes can be performed in a different order, and some processes can be performed in parallel. Additionally, one or more processes can be omitted in various examples. Thus, not all processes are required in every example. Other process flows are possible.

Referring now to FIG. 4, the method or process of diagram 400 begin at operation 402, with the REH component 113 of a memory sub-system 110 (e.g., memory device 140) reading a first portion of a memory block from the memory device 130. Then, at operation 404, the REH component 113 determines that a read bit error rate (RBER) associated with the second portion of the memory block transgresses an RBER threshold and skips reading the second portion of a memory block. At operation 406, the REH component 113 before initiating error correction operations on the second portion, continues to read additional portions of the memory block after determining that the RBER associated with the second portion of the memory block transgresses the RBER threshold. The REH component 113, at operation 410, performs the error correction operations on the second portion using at least the first portion of the memory block and the additional portions of the memory block to correct the second portion of the memory block.

Figure 5:
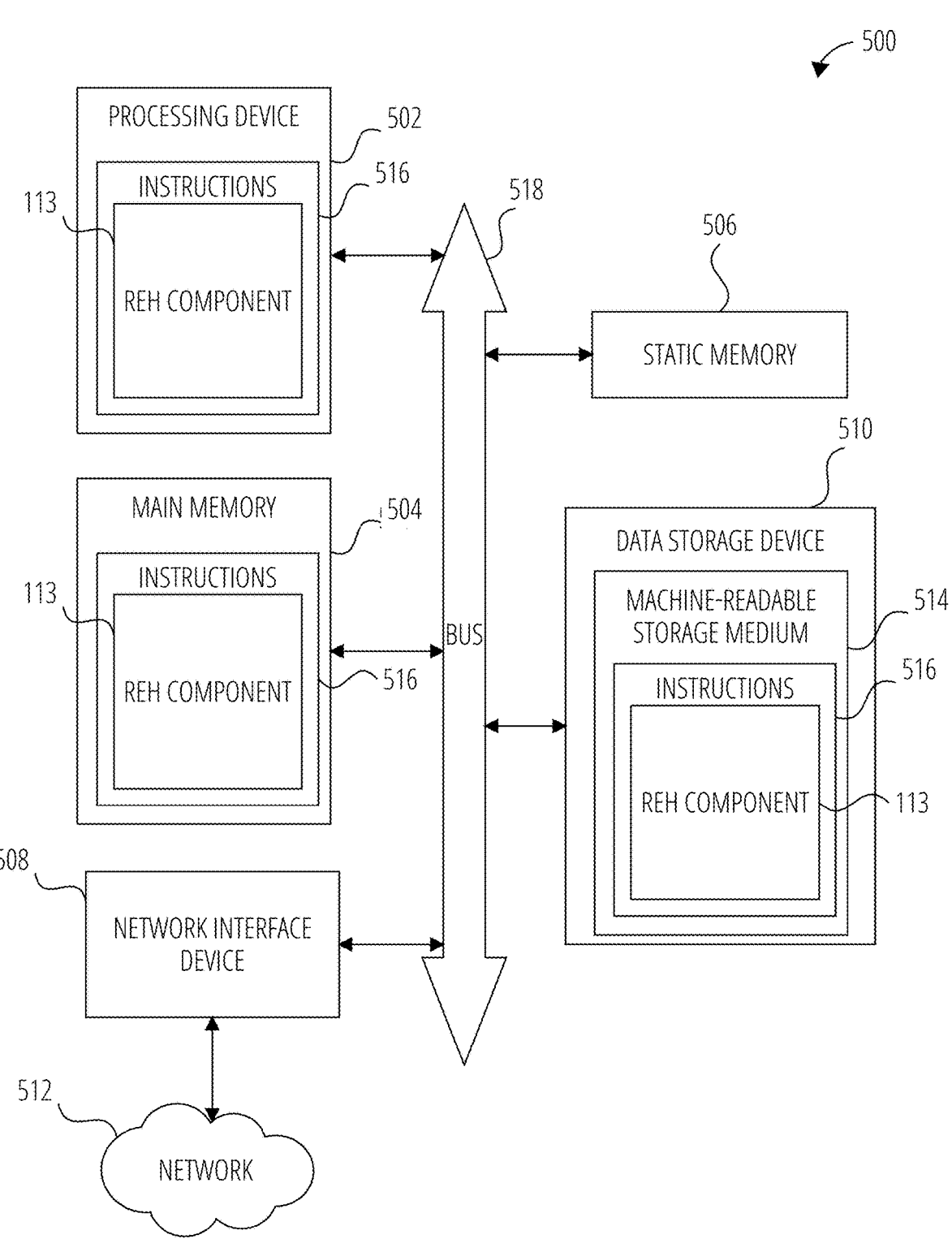
FIG. 5 is a block diagram of an example computer system, according to some examples.

FIG. 5 illustrates an example machine in the form of a computer system 500 within which a set of instructions can be executed for causing the machine to perform any one or more of the methodologies discussed herein. In some examples, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative examples, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., ROM, flash memory, DRAM such as SDRAM or Rambus DRAM (RDRAM), etc.), a static memory 506 (e.g., flash memory, static random access memory (SRAM), etc.), and a data storage device 510, which communicate with each other via a bus 518.

The processing device 502 represents one or more general-purpose processing devices such as a microprocessor, a central processing unit, or the like. More particularly, the processing device 502 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 502 can also be one or more special-purpose processing devices such as an application-specific integrated circuit (ASIC), a field programmable gate array (FPGA), a digital signal processor (DSP), a network processor, or the like. The processing device 502 is configured to execute instructions 516 for performing the operations and steps discussed herein. The computer system 500 can further include a network interface device 508 to communicate over a network 512.

The data storage device 510 can include a machine-readable storage medium 514 (also known as a computer-readable medium) on which is stored one or more sets of instructions 516 or software embodying any one or more of the methodologies or functions described herein. The instructions 516 can also reside, completely or at least partially, within the main memory 504 and/or within the processing device 502 during execution thereof by the computer system 500, the main memory 504 and the processing device 502 also constituting machine-readable storage media. The machine-readable storage medium 514, data storage device 510, and/or main memory 504 can correspond to the memory sub-system 110 of FIG. 1.

In one example, the instructions 516 include instructions to implement functionality corresponding to providing block failure protection for a zone memory sub-system as described herein (e.g., the REH component 113 of FIG. 1). While the machine-readable storage medium 514 is shown in an example to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Described implementations of the subject matter can include one or more features, alone or in combination as illustrated below by way of examples.

Example 1. A system comprising: a memory device; and a processing device, operatively coupled to the memory device, configured to perform operations comprising: reading a first portion of a memory from the memory device; skipping reading a second portion of the memory block when determining that a read bit error rate (RBER) associated with the second portion of the memory block transgresses an RBER threshold; before initiating error correction operations on the second portion, continuing to read additional portions of the memory block after determining that the RBER associated with the second portion of the memory block transgresses the RBER threshold; and performing the error correction operations on the second portion using at least the first portion of the memory block and the additional portions of the memory block to correct the second portion of the memory block.

Example 2. The system of Example 1, the operations comprising: receiving a request to read a memory block from the memory device, the first portion being read in response to receiving the request.

Example 3. The system of Example 2, wherein the request is generated by the processing device in response to generating a request to fold the memory block.

Example 4. The system of Example 3, wherein the operations comprise: transferring valid data from the first portion of the memory block, the additional portions of the memory block, and the corrected second portion of the memory block to a new memory block.

Example 5. The system of Example 4, wherein the operations comprise: searching a logical-to-physical (L2P) table based on physical-to-logical (P2L) information associated with the memory block to identify the valid data in the memory block.

Example 6. The system of any one of Examples 1-5, wherein the memory block comprises a block stripe (BS), wherein the first portion of the memory block comprises data of the BS stored on a first logical unit number (LUN), and wherein the second portion of the memory block comprises data of the BS stored on a second LUN.

Example 7. The system of Example 6, wherein the first LUN comprises a first memory die, and wherein the second LUN comprises a second memory die.

Example 8. The system of any one of Examples 6-7, the operations comprising: determining that data stored in one or more planes of the second LUN comprises uncorrectable errors to determine that the RBER associated with the second portion of the memory block transgresses the RBER threshold.

Example 9. The system of any one of Examples 1-8, wherein the error correction operations comprise redundant array of independent NAND (RAIN) operations.

Example 10. The system of any one of Examples 1-9, the operations comprising: performing one or more XOR logic operations on the data stored in the first and additional portions of the memory block to recover data associated with the second portion of the memory block.

Example 11. The system of any one of Examples 1-10, the operations comprising: determining that each portion of the memory block except the second portion for which the RBER transgresses the RBER threshold has been read; and in response to determining that each portion of the memory block except the second portion for which the RBER transgresses the RBER threshold has been read, initiating the error correction operations to correct the second portion.

Example 12. The system of Example 11, the operations comprising: reading valid data and invalid data of the first portion of the memory block; accessing error correction information associated with the memory block; and correcting the second portion using the valid data and invalid data of the first portion and the error correction information.

Example 13. The system of claim 12, the operations comprising: discarding the invalid data after correcting the second portion.

Example 14. The system of any one of Examples 12-13, the operations comprising: determining which set of data in the second portion corresponds to valid data; and correcting the set of data in the second portion that corresponds to valid data without correcting invalid data of the second portion.

Example 15. The system of any one of Examples 1-11, wherein the memory device comprises a three-dimensional (3D) NAND device.

Example 16. At least one non-transitory machine-readable storage medium comprising instructions that, when executed by a processing device, cause the processing device to perform operations comprising: reading a first portion of a memory block from a memory device; skipping reading a second portion of the memory block when determining that a read bit error rate (RBER) associated with the second portion of the memory block transgresses an RBER threshold; before initiating error correction operations on the second portion, continuing to read additional portions of the memory block after determining that the RBER associated with the second portion of the memory block transgresses the RBER threshold; and performing the error correction operations on the second portion using at least the first portion of the memory block and the additional portions of the memory block to correct the second portion of the memory block.

Example 17. A method comprising: reading a first portion of a memory block from a memory device; skipping reading a second portion of the memory block when determining that a read bit error rate (RBER) associated with the second portion of the memory block transgresses an RBER threshold; before initiating error correction operations on the second portion, continuing to read additional portions of the memory block after determining that the RBER associated with the second portion of the memory block transgresses the RBER threshold; and performing the error correction operations on the second portion using at least the first portion of the memory block and the additional portions of the memory block to correct the second portion of the memory block.

The term "coupled with" generally refers to a connection between components, which can be an indirect communicative connection or direct communicative connection (e.g., without intervening components), whether wired or wireless, including connections such as electrical, optical, magnetic, and the like.

"System data" hereinafter refers to data that is created and/or maintained by the memory sub-system for performing operations in response to host requests and for media management.

"User data" hereinafter generally refers to host data and garbage collection data.

"Folding" refers to an operation where data from multiple partially filled pages or blocks is combined and rewritten into a single page or block. This process helps to optimize storage space utilization, reduce write amplification, and improve overall performance of the NAND storage device by consolidating fragmented data and freeing up space for new writes. Folding and "relocation" operations are used interchangeably and mean the same thing.

"RAIN" refers to a process used in NAND flash memory to improve reliability and performance. It works by implementing redundancy and error correction at the chip level or memory device level. RAIN distributes data across multiple NAND chips or memory dies within a single SSD or NAND storage system, storing redundant information to allow for data recovery in case of chip failures or errors. RAIN employs advanced error correction algorithms to detect and correct errors at the chip or memory die level to enhance data integrity. By spreading data across multiple chips or memory dies, RAIN can improve read and write speeds through parallel operations. If one NAND chip or memory die fails, the redundant data stored on other chips or memory dies can be used to reconstruct the lost information, reducing data loss risks. Additionally, RAIN can help distribute write operations more evenly across NAND chips, potentially extending the overall lifespan of the SSD.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, ROMs, RAMs, EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium (such as a non-transitory machine-readable medium) having stored thereon instructions, which can be used to program a computer system (or other electronic devices) to perform a process according to the present disclosure. A machine-readable medium includes any mechanism for storing information in a form readable by a machine (e.g., a computer). In some examples, a machine-readable (e.g., computer-readable) medium includes a machine (e.g., a computer) readable storage medium such as a ROM, RAM, magnetic disk storage media, optical storage media, flash memory components, and so forth. A machine-readable storage medium can be non-transitory (in other words, not having any transitory signals) in that it does not embody a propagating signal. However, labeling a machine-readable storage medium "non-transitory" should not be construed to mean that the machine-readable storage medium is incapable of movement; the machine-readable storage medium should be considered as being transportable from one physical location to another.

In the foregoing specification, examples of the disclosure have been described with reference to specific examples thereof. It will be evident that various modifications can be made thereto without departing from the broader scope of examples of the disclosure as set forth in the following claims. The specification and drawings are, accordingly, to be regarded in an illustrative sense rather than a restrictive sense.

The invention claimed is:

1. A system comprising:
a memory device; and
a processing device, operatively coupled to the memory device, configured to perform operations comprising:
reading a first portion of a memory block from the memory device;
skipping reading a second portion of the memory block when determining that a read bit error rate (RBER) associated with the second portion of the memory block transgresses an RBER threshold;
before initiating error correction operations on the second portion, continuing to read additional portions of the memory block after determining that the RBER associated with the second portion of the memory block transgresses the RBER threshold; and
performing the error correction operations on the second portion using at least the first portion of the memory block and the additional portions of the memory block to correct the second portion of the memory block.

2. The system of claim 1, the operations comprising:
receiving a request to read a memory block from the memory device, the first portion being read in response to receiving the request.

3. The system of claim 2, wherein the request is generated by the processing device in response to generating a request to fold the memory block.

4. The system of claim 3, wherein the operations comprise:
transferring valid data from the first portion of the memory block, the additional portions of the memory block, and the corrected second portion of the memory block to a new memory block.

5. The system of claim 4, wherein the operations comprise:
searching a logical-to-physical (L2P) table based on physical-to-logical (P2L) information associated with the memory block to identify the valid data in the memory block.

6. The system of claim 1, wherein the memory block comprises a block stripe (BS), wherein the first portion of the memory block comprises data of the BS stored on a first logical unit number (LUN), and wherein the second portion of the memory block comprises data of the BS stored on a second LUN.

7. The system of claim 6, wherein the first LUN comprises a first memory die, and wherein the second LUN comprises a second memory die.

8. The system of claim 6, the operations comprising:
determining that data stored in one or more planes of the second LUN comprises uncorrectable errors to determine that the RBER associated with the second portion of the memory block transgresses the RBER threshold.

9. The system of claim 1, wherein the error correction operations comprise redundant array of independent NAND (RAIN) operations.

10. The system of claim 1, the operations comprising:
performing one or more XOR logic operations on data stored in the first and additional portions of the memory block to recover data associated with the second portion of the memory block.

11. The system of claim 1, the operations comprising:
determining that each portion of the memory block except the second portion for which the RBER transgresses the RBER threshold has been read; and
in response to determining that each portion of the memory block except the second portion for which the RBER transgresses the RBER threshold has been read, initiating the error correction operations to correct the second portion.

12. The system of claim 11, the operations comprising:
reading valid data and invalid data of the first portion of the memory block;
accessing error correction information associated with the memory block; and
correcting the second portion using the valid data and invalid data of the first portion and the error correction information.

13. The system of claim 12, the operations comprising:
discarding the invalid data after correcting the second portion.

14. The system of claim 12, the operations comprising:
determining which set of data in the second portion corresponds to valid data; and
correcting the set of data in the second portion that corresponds to valid data without correcting invalid data of the second portion.

15. The system of claim 1, wherein the memory device comprises a three-dimensional (3D) NAND device.

16. At least one non-transitory machine-readable storage medium comprising instructions that, when executed by a processing device, cause the processing device to perform operations comprising:
reading a first portion of a memory block from a memory device;
skipping reading a second portion of the memory block when determining that a read bit error rate (RBER) associated with the second portion of the memory block transgresses an RBER threshold;
before initiating error correction operations on the second portion, continuing to read additional portions of the memory block after determining that the RBER associated with the second portion of the memory block transgresses the RBER threshold; and
performing the error correction operations on the second portion using at least the first portion of the memory block and the additional portions of the memory block to correct the second portion of the memory block.

17. The non-transitory machine-readable storage medium of claim 16, the operations comprising:
receiving a request to read a memory block from the memory device, the first portion being read in response to receiving the request.

18. The non-transitory machine-readable storage medium of claim 17, wherein the request is generated by the processing device in response to generating a request to fold the memory block.

19. The non-transitory machine-readable storage medium of claim 16, wherein the memory block comprises a block stripe (BS), wherein the first portion of the memory block comprises data of the BS stored on a first logical unit number (LUN), and wherein the second portion of the memory block comprises data of the BS stored on another LUN.

20. A method comprising:

reading a first portion of a memory block from a memory device;

skipping reading a second portion of the memory block when determining that a read bit error rate (RBER) associated with the second portion of the memory block transgresses an RBER threshold;

before initiating error correction operations on the second portion, continuing to read additional portions of the memory block after determining that the RBER associated with the second portion of the memory block transgresses the RBER threshold; and performing the error correction operations on the second portion using at least the first portion of the memory block and the additional portions of the memory block to correct the second portion of the memory block.

* * * * *